United States Patent Office 2,842,526
Patented July 8, 1958

2,842,526

VINYLCYCLOHEXANETHIOLS AND POLYMERS THEREOF

Fredrick M. Smith, Rosamond, Calif., and James E. Pritchard, Bartlesville, Okla., assignors to Phillips Petroleum Company, a corporation of Delaware No Drawing. Application September 8, 1952
Serial No. 308,715

30 Claims. (Cl. 260—79.7)

This invention relates to vinylcyclohexanethiols and polymers thereof. In one aspect, the invention relates to vinylcyclohexanethiols and polymers thereof as new compositions of matter. In another aspect, the invention relates to a method for the preparation of vinylcyclohexanethiols and polymers thereof. In another aspect, the invention relates to the production of vinylcyclohexanethiols by the reaction of a vinylcyclohexene with hydrogen sulfide in the presence of a catalyst. In a further aspect, the invention relates to the catalytic polymerization of a vinylcyclohexanethiol to form oils and solid polymers. In an additional aspect, the invention relates to the reaction of said oils and polymers with a nitrogen compound to produce resins. In still another aspect, the invention relates to the simultaneous production of vinylcyclohexanethiols and polymers thereof. In yet another aspect, the invention relates to the production of a sulfur-containing, benzene-insoluble synthetic rubber.

The vinylcyclohexanethiols produced in accordance with this invention are useful as modifiers in the production of synthetic rubber. They are also useful for treating rubber-like polymers to convert said polymers to oil-resistant resins.

The polymers produced in accordance with this invention can be used to produce resins which can be drawn to form filaments.

In accordance with the invention, a vinylcyclohexene is reacted with hydrogen sulfide in the presence of a solid contact catalyst to produce a vinylcyclohexanethiol; for example, 4-vinyl-1-cyclohexene can be reacted with hydrogen sulfide in the presence of a catalyst to produce 4-vinyl-1-cyclohexanethiol and 3-vinyl-1-cyclohexanethiol.

Further, in accordance with the invention, the vinylcyclohexanethiols can be reacted in the presence of a catalyst to form oily and resinous polymers. It is believed that the polymers are polymeric thioethers. In one modification, hydrogen sulfide is reacted with vinylcyclohexene to produce vinylcyclohexanethiol, part of which can be recovered as such and part recycled, together with unreacted vinylcyclohexene and hydrogen sulfide, to the original reaction step. In this modification, the recycled vinylcyclohexanethiol is polymerized, and vinylcyclohexanethiol and polymers thereof are simultaneously produced and separately recovered.

Still further, in accordance with the invention, the vinylcyclohexanethiol polymers can be reacted with an organic nitrogen compound, such as ethylenediamine, diethylenetriamine, triethylenetetramine, tetraethylenepentamine, or hexamethylenetetramine, to obtain solid resins.

Also, in accordance with the invention, a vinylcyclohexanethiol can be incorporated into a polybutadiene latex, recipe, or solution to produce a synthetic rubber or resin having desirable properties.

The catalysts used to effect the reaction of hydrogen sulfide with vinylcyclohexene are solid contact condensation catalysts selected from the group consisting of acid-treated clay, such as acid-treated montmorillonite, sub-bentonite clay (e. g. Super Filtrol) and silica-alumina. The preparation of these catalysts is well known to those skilled in the art of hydrocarbon conversion.

The reaction conditions for the hydrogen sulfide-vinylcyclohexene reaction are substantially as follows: a mol ratio of hydrogen sulfide to vinylcyclohexene in the range 1:1 to 6:1, preferably 1.5:1 to 6:1; a temperature in the range 150–300° F., preferably 200–300° F.; a pressure in the range of 500–2000 p. s. i. g., preferably 700–1500 p. s. i. g.; a space velocity in the range of 0.1 to 10, preferably 0.5 to 2 liquid volumes of reactants per volume of catalyst per hour. It is essential that the reaction be conducted in the substantial absence of oxygen in order to prevent side reactions, such as organic sulfide formation. The vinylcyclohexanethiol can be recovered from the reaction effluent by vacuum distillation. It can be further purified by the formation of the cadmium mercaptide and subsequent decomposition thereof.

The catalyst used for the polymerization of vinylcyclohexanethiol in accordance with the invention is selected from the group of polymerization catalysts consisting of acid-treated clays, such as acid-treated montmorillonite, sub-bentonite clay; silica-alumina; and mixtures of glacial acetic acid with an oxygen-yielding material such as an alkali-metal persulfate or perborate or with an organic peroxide compound such as a peroxide or a hydroperoxide, e. g. benzoyl peroxide, t-butyl hydroperoxide, etc.

The polymerization of vinylcyclohexanethiol in accordance with this invention is conducted under the following conditions, when solid contact catalysts such as acid-treated clays and silica-alumina are used: a temperature in the range of 70–325° F., preferably 100–300° F., and more preferably 150–300° F.; a pressure in the range of 0–2000 p. s. i. g., preferably 500–2000 p. s. i. g.; and a liquid hourly space velocity in the range of 0.1 to 10, preferably 0.5 to 2 volumes of reactants per volume of catalyst. The molecular weight of the polymeric thioethers depends on the specific temperature and pressure of the polymerization reaction. Generally, higher pressures and lower temperatures in the disclosed ranges favor the formation of polymers having high molecular weight.

When a mixture of acetic acid and oxygen-yielding compound is used as a catalyst for polymerizing vinylcyclohexanethiol, the amount of oxygen-yielding compound used is in the range of 0.2 to 2.5 moles per mole of vinylcyclohexanethiol. When the oxygen-yielding compound is one such as potassium persulfate, it is preferred that an excess over that required to saturate the glacial acetic acid be used. In such a reaction, the temperature is ordinarily in the range of 100° F. to the boiling point of glacial acetic acid at the pressure of the reaction.

Further, in accordance with the invention, the vinylcyclohexanethiol polymers can be converted to hard resins that are light yellow in color by treatment with an organic polyamine as previously mentioned. This resin-forming reaction is conducted by heating the polymer with the polyamine at a temperature in the range of 250–350° F. The amount of the amino compound employed is in the range of 0.1 to 10% by weight based on the polymer. It is believed that the nitrogen-containing compound reacts with the thiol groups to produce a cross-linked product. The resins formed are useful in the preparation of plastic articles, coating compositions, and the like. They are soluble in chloroform and may be precipitated therefrom with acetone to yield thermoplastic resins which can be drawn to form filaments.

The polymeric thioethers of this invention range in characteristics from light yellow oils to hard resins which vary in color from yellow to brown. They are sparingly soluble in acetone and alcohol, and soluble in halogenated solvents such as chloroform and carbon tetrachloride. The oily polymers are soluble in benzene.

In one modification of the invention, hydrogen sulfide is reacted with vinylcyclohexene in the presence of an acid-treated clay or silica-alumina under conditions previously described and part of the vinylcyclohexanethiol produced is recovered as such. The remainder, together with unreacted vinylcyclohexene and hydrogen sulfide, is recycled to the catalytic reaction step. The recycled vinylcyclohexanethiol polymerizes to form the polymers which are recovered as products of the process. Thus vinylcyclohexanethiol and polymers thereof are simultaneously produced in the same process. Vinylcyclohexanethiol and unreacted vinylcyclohexene can be recovered from the effluent by extraction with a solvent such as acetone and recycled after removal of the acetone or other solvent by distillation.

*Example I*

A blend of 4-vinyl-1-cyclohexene and hydrogen sulfide in a mole ratio of 1:2 was brought into contact with a Super Filtrol catalyst which had previously been dried for 10 hours in an atmosphere of nitrogen at a temperature ranging from 200–250° F. The volume of catalyst in the reactor was 1000 ml. The feed, consisting of hydrogen sulfide in solution in 4-vinyl-1-cyclohexene, was forced through the reactor by applying nitrogen under pressure to the feed tank. The reactor effluent was distilled, at first, at atmospheric pressure at a reflux ratio of 10/1. The distillation was finished at pressures ranging from 560 to 240 mm. of mercury. This method of operation kept the kettle temperature below 200° F. The following table shows the reaction conditions, quantities of materials used, and products obtained.

Reaction conditions:
  Temperature range, ° F_____ 150–225
  Pressure, p. s. i. g_____ 800
  Space velocity, liq. vol./vol. cat./hr___ 2

Composition of charge, lb.:
  4-vinyl-1-cyclohexene _____ 21.6
  Hydrogen sulfide_____ 13.6
    Total _____ 35.2

Product distillation:
  Charge to still, lb_____ 19.046
  Recovery, lb.—
    Light material_____ 0.065
    4-vinyl-1-cyclohexene _____ 16.832
    Bottoms _____ 2.054
    Total _____ 18.951
  Loss _____ 0.095

The bottoms product was purified by distillation at a pressure of 35 mm. Hg to recover the vinylcyclohexanethiol product. After removing the light ends, a heart cut was obtained which had a boiling point ranging from 98–101° C. (208.4–213.8° F.) at 35 mm. Hg and a refractive index, N 20/D, of 1.5106. This cut represented 32.5 percent by weight of all material boiling at a higher temperature than 4-vinyl-1-cyclohexene. Analysis of this purified material gave the following results:

|  | Found | Theoretical for Vinyl-cyclohexanethiol |
|---|---|---|
| Carbon | 66.54 | 67.54 |
| Hydrogen | 9.93 | 9.92 |
| Sulfur | 22.47 | 22.54 |
| Molecular Weight | 146 | 142 |

A sample of vinylcyclohexanethiol was purified by preparing the cadmium salt, dispersing it in a 0.5 percent aqueous solution of Triton X–100 alkylated aryl polyether alcohol detergent, and then adding hydrochloric acid to hydrolyze the product. The vinylcyclohexanethiol was steam distilled as rapidly as it was formed. An infrared spectroanalysis was made. Absorption bands which are typical of vinyl groups and terminal double bonds were found and there was no indication of the presence of double bonds in the ring.

*Example II*

A blend of 4-vinyl-1-cyclohexene and hydrogen sulfide in a mol ratio of 1:2 was brought into contact with a Super Filtrol catalyst in a manner similar to that described in Example I. The reactor effluent was distilled at a reflux ratio of 2/1 at the start, then at 3/1, and finally 5/1 near the end of the distillation. The distillation was stopped when the kettle reached a temperature of 300° F. under a pressure of 196 mm. of mercury. The following table shows the reaction conditions, quantities of materials used, and products obtained.

Reaction conditions:
  Catalyst volume, ml_____ 2000
  Pressure, p. s. i. g_____ 1000
  Temperature, bath, ° F_____ 251–257
    Top catalyst section, ° F_____ 249–260
    Middle catalyst section, ° F_____ 253–257
    Bottom catalyst section, ° F_____ 258–274

Feed rate, lb./hr_____ 6.22
    Approx. space velocity, liq. vol./vol. cat./hr. 1.6

Feed composition, lb.:
    4-vinyl-1-cyclohexene _____ 8.53
    Hydrogen sulfide_____ 5.43
      Total _____ 13.96

Products:
  Recovery, lb.—
    Hydrogen sulfide (includes any reactor losses) _____ 4.60
    4-vinyl-1-cyclohexene _____ 7.59
    Bottoms _____ 1.77
      Total _____ 13.96

The vinylcyclohexanethiol product was recovered by distillation in the manner described in Example I.

*Example III*

The vinylcyclohexanethiol product, prepared as previously described, was used as a modifier in a series of runs for the copolymerization of butadiene with styrene at 50° C. The polymerization recipe was as follows:

|  | Parts by weight |
|---|---|
| Butadiene | 75 |
| Styrene | 25 |
| Water | 180 |
| Sodium soap flakes | 5 |
| Vinylcyclohexanethiol | Variable |
| Potassium persulfate | 0.3 |

The following results were obtained:

| Vinylcyclohexanethiol | | Time, Hours | Conversion, Percent | Mooney Value, ML–4 |
|---|---|---|---|---|
| Parts by Weight | Wt. Percent | | | |
| 0.3 | 0.11 | 13.8 | 74 | 126 |
| 0.5 | 0.18 | 14.3 | 73 | 90 |
| 0.7 | 0.25 | 15.8 | 76 | 55 |
| 1.1 | 0.39 | 17.7 | 78 | 49 |
| 1.6 | 0.56 | 18 | 74 | 20 |

These data show that increased proportions, in the range 0.1 to 0.6 weight percent of vinylcyclohexanethiol in the recipe result in decreased Mooney values.

Example IV

A sample of 58 Mooney (ML-4) polybutadiene in latex form was treated with vinylcyclohexanethiol, prepared as hereinbefore described, in an amount sufficient to saturate 15 percent of the double bonds (assuming that there is one double bond per $C_4$ unit in the polybutadiene molecule and that one mole of mercaptan reacts with each double bond). The mixture was agitated for 176 hours at 50° C. in the presence of oxygen. The resulting rubbery polymer contained 1.96 percent sulfur, corresponding to saturation of 3.6 percent of the available double bonds. This product was slightly softer than the original polybutadiene and was composed largely of benzene-insoluble material.

Example V

A benzene solution of 58 Mooney (ML-4) polybutadiene was treated with vinylcyclohexanethiol in an amount sufficient to saturate 30 percent of the double bonds (assuming that there is one double bond per $C_4$ unit in the polybutadiene molecule and that one mole of mercaptan reacts with each double bond). After the mixture was agitated at 50° C. for 88 hours, in the presence of oxygen a material was obtained which contained 3.18 percent sulfur, corresponding to saturation of 6.8 percent. The product was a gel-like, resinous material which was insoluble in benzene and exhibited low swelling characteristics after being immersed in benzene for several weeks.

Examples IV and V show that a benzene-resistant rubber is obtained by treating polybutadiene with a vinylcyclohexanethiol in the presence of oxygen for a time in the range 88 to 176 hours. A temperature in the range 20 to 100° C. is suitable.

Example VI

A blend of 4-vinyl-1-cyclohexene and hydrogen sulfide in a mol ratio of 1:2 was brought into contact with a Super Filtrol catalyst which had previously been dried for 10 hours in an atmosphere of nitrogen at a temperature ranging from 200 to 250° F. The volume of catalyst in the reactor was 1000 ml. The feed, consisting of hydrogen sulfide in solution in 4-vinyl-1-cyclohexene, was supplied by applying nitrogen under pressure to the feed tank which displaced the liquid feed into the reactor. The following table shows the reaction conditions employed and the materials charged:

Reaction conditions:
  Temperature range, ° F ------------------ 150-225
  Pressure, p. s. i. g --------------------- 800
  Space velocity, liq. vol./vol. cat./hr --- 2
Materials charged, lbs.:
  4-vinyl-1-cyclohexene ------------------- 21.6
  Hydrogen sulfide ------------------------ 13.6

The reactor effluent was transferred to a distillation system where the first portion of the distillation was effected at atmospheric pressure using a reflux ratio of 10/1. The distillation was finished at pressures ranging from 560 to 240 mm. of mercury. The kettle temperature was kept below 200° F. In this operation the major portion of unreacted 4-vinyl-1-cyclohexene was removed. The higher-boiling kettle product was transferred to a second distillation system operated at a pressure of 35 mm. of mercury. The remaining 4-vinyl-1-cyclohexene and other light materials were removed overhead first and then the vinylcyclohexanethiol fraction boiling at 98-101° C. (208.4-213.8° F.) at 35 mm. of mercury and having a refractive index, $n\ 20/D$, of 1.5106 was removed. The remainder of the material comprised polymeric thioether products. It was distilled at a pressure of 10 mm. of mercury, and liquid fractions boiling from 82-177° C. (179.6-350.6° F.) were obtained. The fractionation data were as follows:

| Head Temp. ° C. | Kettle Temp. ° C. | n 20/D |
|---|---|---|
| 82 | 190 | 1.5152 |
| 83 | 234 | 1.5158 |
| 92 | 263 | 1.5175 |
| 102 | 260 | 1.5195 |
| 113 | 260 | 1.5245 |
| 119 | 267 | 1.5305 |
| 121 | 280 | 1.5345 |
| 125 | 285 | 1.5345 |
| 133 | 292 | 1.5330 |
| 147 | 308 | 1.5300 |
| 177 | 342 | 1.5278 |

The liquid products were light yellow oils sparingly soluble in acetone and alcohol and soluble in benzene, chloroform and carbon tetrachloride.

The kettle product which boiled above 177° C. (351° F.) at 10 mm. pressure was dissolved in chloroform and precipitated in acetone. The product, which was a dark, hard, thermoplastic resin, represented about three percent of the total product from the synthesis reaction. It could be drawn into fine filaments at room temperature. An 18-inch segment of this filament was found to have an average diameter of about 15 microns and a mass of 0.3 milligram. This corresponds to about 5000 feet of filament per gram of polymer. This polymeric material contained 22.1 percent sulfur.

In the operation of this process larger amounts of the polymeric thioethers can be obtained by recycling the unreacted 4-vinyl-1-cyclohexene and the vinylcyclohexane thiols.

Example VII

Vinylcyclohexanethiol (10 grams), prepared as described in Example VI, was heated with 2 grams of Super Filtrol at 70° C. (158° F.) and atmospheric pressure for 48 hours. A heavy, yellow oil soluble in benzene and sparingly soluble in alcohol was obtained.

Example VIII

A mixture of 28.4 grams (0.2 mole) vinylcyclohexanethiols, prepared as in Example VI, 75 cc. (1.25 moles) glacial acetic acid, and 27 grams (0.1 mole) potassium persulfate was heated at 50° C. (122° F.) for a period of 350 hours. The acetic acid was neutralized with potassium hydroxide, and the organic material was extracted with ether. Distillation at a pressure of 10 mm. of mercury gave the following fractions:

| Head Temperature, ° C. | n 20/D | Mercaptan Sulfur, Percent | Total Sulfur, Percent |
|---|---|---|---|
| 105-132 | 1.5414 | 16.1 | 27.6 |
| 132 | 1.5406 | 14.9 | 27.3 |
| 160-165 | 1.5412 | 11.9 | 24.3 |
| Kettle Product | | 2.8 | 24.4 |

The total yield of polymer, including oils and resins, based on the vinylcyclohexanethiols charged, was 60 percent. The three fractions distilled were light yellow oils. The kettle product was also light yellow and very viscous.

The kettle product was treated with acetone to remove any soluble material. The light yellow viscous oil which remained contained 22 percent sulfur. It was heated with approximately 5 percent of its weight of hexamethylenetetramine for two hours at 150° C. (302° F.). A hard, yellow resin was obtained which adhered firmly to glass.

In copending application Serial Number 675,021, filed July 30, 1957, which is a divisional application of the present application, there are set forth, described and claimed, process and product obtained when a synthetic rubber is modified by incorporation therein of monovinylcyclohexanethiol as set forth in the present application.

Variation and modification are possible within the scope of the foregoing disclosure and appended claims to the invention, the essence of which is that vinylcyclohexanethiols are prepared by the catalytic reaction of vinylcyclohexene with hydrogen sulfide; that vinylcyclohexanethiols can be polymerized in the presence of a catalyst to obtain oily and resinous polymers; that said oily polymers can be heated with an alkylene polyamine to produce solid resins; and that rubber-like polymers can be rendered resistant to benzene by treatment with a vinylcyclohexanethiol.

We claim:

1. Monovinylcyclohexanethiol.
2. Vinylcyclohexanethiol having the following chemical constitution: 66.5% carbon, 9.9% hydrogen, 22.5% sulfur; said vinylcyclohexanethiol having a boiling range of 98–101° C. at a pressure of 35 mm. of mercury and a refractive index ($n$ 20/D) of about 1.5106.
3. 4-vinyl-1-cyclohexanethiol.
4. 3-vinyl-1-cyclohexanethiol.
5. A process for the preparation of monovinylcyclohexanethiol which comprises reacting at an elevated temperature 4-vinyl-1-cyclohexene with hydrogen sulfide in the presence of a solid clay-type contact catalyst under non-oxidizing conditions.
6. The process of claim 5 in which the catalyst is selected from the group consisting of acid-treated clay and silica-alumina.
7. A process for the preparation of monovinylcyclohexanethiol which comprises reacting hydrogen sulfide with 4-vinyl-1-cyclohexene in a non-oxidizing atmosphere and in the presence of a catalyst comprising acid-treated montmorillonite, sub-bentonite clay at a temperature in the range of 150–300° F., a pressure in the range 0–2000 p. s. i. g., and a liquid hourly space velocity in the range 0.1 to 10 volumes of reactant per volume of catalyst and recovering said vinylcyclohexanethiol as a product of the process.
8. The process which comprises contacting hydrogen sulfide in solution in 4-vinyl-1-cyclohexene with an acid-treated montmorillonite sub-bentonite clay, previously dried in an atmosphere of nitrogen for 10 hours at a temperature in the range 200–250° F., at a contacting temperature in the range 150–225° F., a pressure in the range 700 to 1500 p. s. i. g., a mol ratio of hydrogen sulfide to 4-vinyl-1-cyclohexene in the range 1.5:1 to 6:1, and a liquid hourly space velocity in the range 0.5 to 2 volumes of reactant per volume of catalyst; distilling the reaction product in vacuo to obtain a fraction boiling in the range 208–214° F. at 35 mm. of mercury; reacting said fraction to form a cadmium salt, dispersing said cadmium salt in water, treating said salt with hydrochloric acid to hydrolyze said cadmium salt, and steam-distilling vinylcyclohexanethiol from said cadmium salt as rapidly as said vinylcyclohexanethiol is liberated.
9. The process of preparation of a polymeric thioether as follows: blending 4-vinyl-1-cyclohexene and hydrogen sulfide in a mol ratio in the range 1:1.5 to 1:6, contacting said blend with acid-treated montmorillonite, sub-bentonite clay, previously dried for 10 hours in an atmosphere of nitrogen at 200–250° F., at a temperature in the range 150–225° F., a pressure in the range 700 to 1500 p. s. i. g. and a liquid hourly space velocity in the range 0.5 to 2 volumes of reactant per volume of catalyst, distilling the reaction effluent thus obtained at a temperature below 200° F. to remove unreacted 4-vinyl-1-cyclohexene, then distilling at sub-atmospheric pressure to remove unreacted vinylcyclohexanethiols, and then further distilling at about 10 mm. of mercury to obtain liquid polymeric thioethers boiling from 82–177° C. (179.6–350.6° F.) as overhead and a kettle product boiling at a higher temperature.
10. The preparation of claim 9 wherein the kettle product is dissolved in chloroform and precipitated in acetone to obtain a thermoplastic resin.
11. The process of claim 27 in which the temperature is in the range 70–325° F., the pressure is in the range 0–2000 p. s. i. g., and the liquid hourly space velocity is in the range 0.1 to 10 liquid volumes of thiol per volume of catalyst.
12. The process of claim 27 in which the catalyst is glacial acetic acid containing an alkali-metal persulfate.
13. The process of claim 27 in which the catalyst is glacial acetic acid saturated with an alkali-metal perborate.
14. The preparation of a heavy yellow, benzene-soluble oil which comprises heating monovinylcyclohexanethiol in the presence of an acid-treated clay at a temperature in the range 100 to 300° F.
15. The preparation of polymeric thioethers of vinylcyclohexanethiols which comprises heating monovinylcyclohexanethiol in the presence of glacial acetic acid and potassium persulfate at a temperature in the range 100 to 300° F.
16. Polymeric thioethers of vinylcyclohexanethiols boiling in the range 179.6–350.6° F. (82–177° C.) at 10 mm. of mercury containing about 22 percent sulfur and having the appearance of light yellow oil.
17. A homopolymer of vinylcyclohexanethiol.
18. The preparation of solid polymeric products of vinylcyclohexanethiols, which preparation comprises heating liquid polymeric thioethers of vinylcyclohexanethiol with an alkylene polyamine to form a solid reaction product.
19. The preparation of hard resinous material from an oil-like polymeric thioether of vinylcyclohexanethiol which comprises heating said oil-like polymeric thioether at a temperature in the range 250–350° F. with a nitrogen-containing compound selected from the group consisting of hexamethylenetetramine, ethylenediamine, diethylenetriamine, triethylenetetramine, and tetraethylenepentamine so as to form a solid reaction product.
20. The preparation of claim 19 wherein the nitrogen-containing compound is used in an amount of 0.1 to 10 percent by weight of the polymeric thioether.
21. A hard, adherent, yellow resin obtained by heating liquid polymeric vinylcyclohexanethiol with from 0.1 to 10 weight percent of an alkylene polyamine at a temperature in the range 250 to 350° F.
22. A process for the preparation of monovinylcyclohexanethiol which process comprises reacting hydrogen sulfide with a vinylcyclohexene in a non-oxidizing atmosphere and in the presence of a catalyst selected from the group consisting of acid-treated clay and silica-alumina, said reaction being conducted at a temperature in the range 150 to 300° F., a pressure in the range 500 to 2000 p. s. i. g., and space velocity in the range 0.1 to 10 liquid volumes of vinylcyclohexene per volume of catalyst per hour, and recovering a monovinylcyclohexanethiol as a product.
23. A process according to claim 22 wherein the temperature is in the range 200 to 300° F., the pressure is in the range 700 to 1500 p. s. i. g., and the space velocity within the range 0.5 to 2 volumes of liquid vinylcyclohexene per volume of catalyst per hour.
24. An oily polymer of monovinylcyclohexanethiol, said polymer being sparingly soluble in acetone and in alcohol, and soluble in chloroform, in carbon tetrachloride and in benzene and containing about 22 percent sulfur.
25. A hard resinous polymer of monovinylcyclohexanethiol, said polymer being sparingly soluble in acetone and in alcohol, and soluble in chloroform and in carbon tetrachloride.
26. A resin produced by heating a polymer of monovinylcyclohexanethiol with a minor proportion of an alkylene polyamine.
27. A process for preparing a polymeric thioether which comprises polymerizing monovinylcyclohexanethiol in the presence of a polymerization catalyst selected from the group consisting of acid-treated clay, silica-alumina, and mixtures of glacial acetic acid with an oxygen-yielding peroxy compound.

28. The process of claim 27 which comprises recovering from the polymerization reaction polymeric thioether as a product of the process, also recovering separately monovinylcyclohexanethiol and recycling said monovinylcyclohexanethiol to said polymerization.

29. A process according to claim 28 wherein the monovinylcyclohexanethiol is recovered from the polymerization by extraction with a solvent.

30. A process according to claim 29 wherein said solvent is acetone.

References Cited in the file of this patent
UNITED STATES PATENTS

| | | |
|---|---|---|
| 2,125,649 | Reppe et al. | Aug. 2, 1938 |
| 2,347,182 | Coffman | April 25, 1944 |
| 2,364,416 | Ayers et al. | Dec. 5, 1944 |
| 2,378,535 | Brubaker | June 19, 1945 |
| 2,378,536 | Brubaker | June 19, 1945 |
| 2,416,440 | Fryling | Feb. 25, 1947 |
| 2,460,567 | Browning | Feb. 1, 1949 |
| 2,543,867 | Pritchard | Mar. 6, 1951 |
| 2,551,813 | Pinkney | May 8, 1951 |
| 2,556,856 | Swaney et al. | June 12, 1951 |
| 2,592,089 | Warner | April 8, 1952 |
| 2,610,981 | Short | Sept. 16, 1952 |
| 2,720,509 | Dees | Oct. 11, 1955 |